Sept. 16, 1930. O. C. KNIGGE 1,775,726
REFUSE COLLECTION VEHICLE
Filed June 15, 1927 6 Sheets-Sheet 1
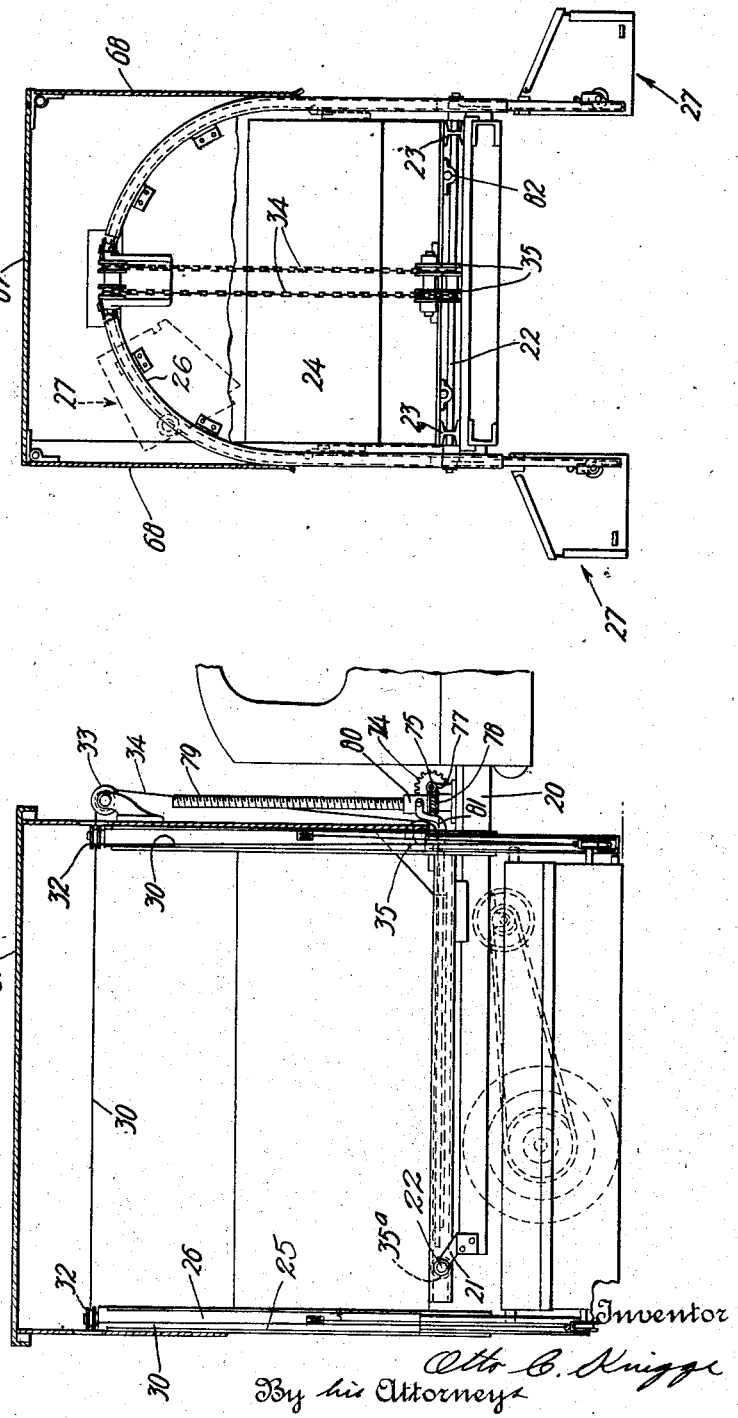

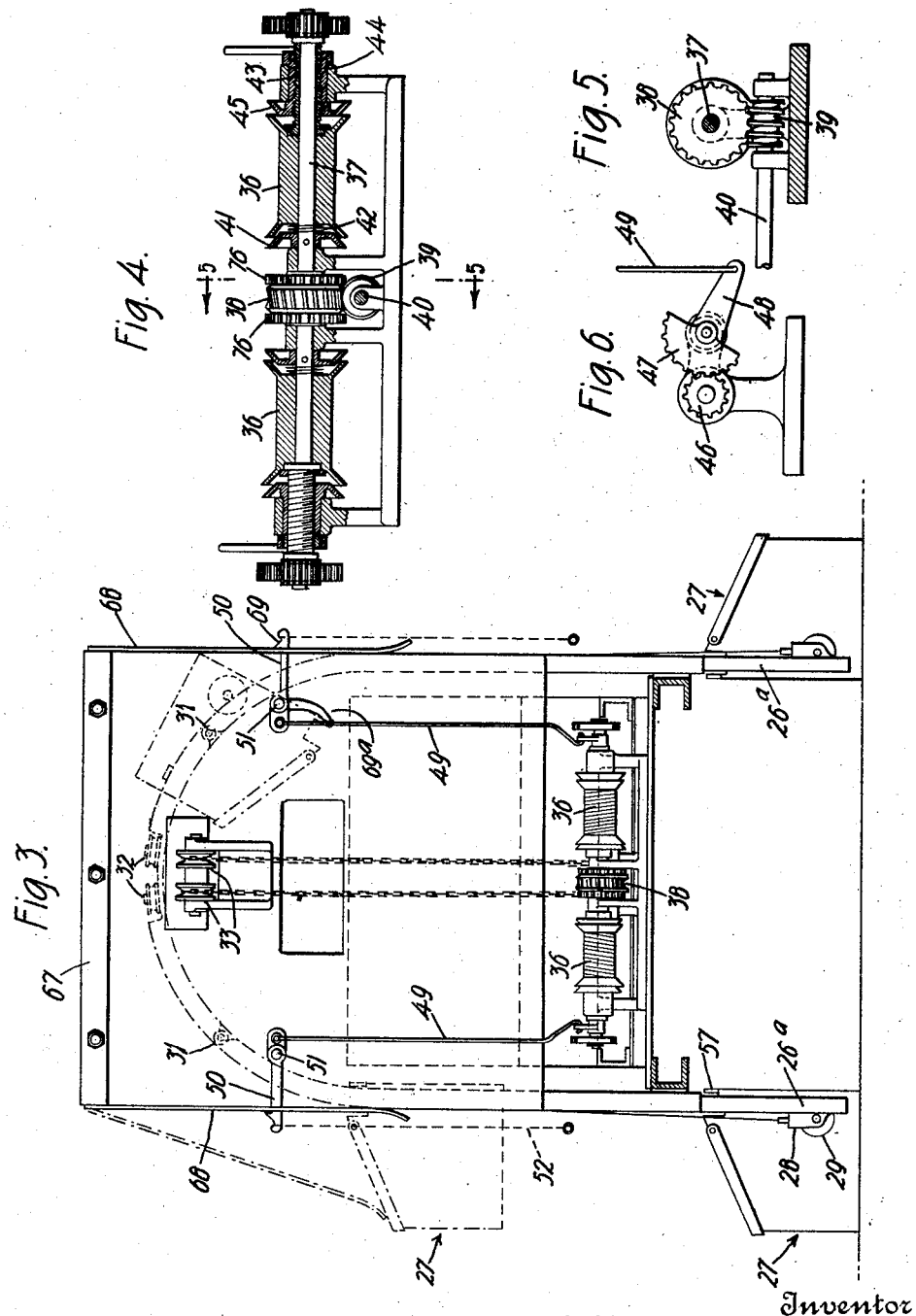

Sept. 16, 1930.　　　O. C. KNIGGE　　　1,775,726
REFUSE COLLECTION VEHICLE
Filed June 15, 1927　　6 Sheets-Sheet 3
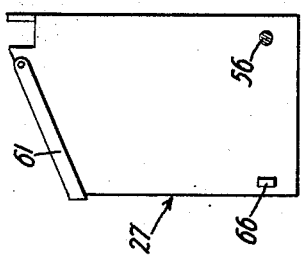
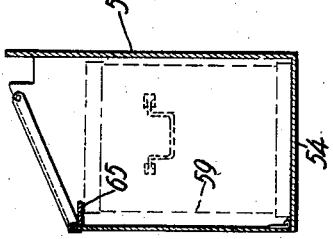
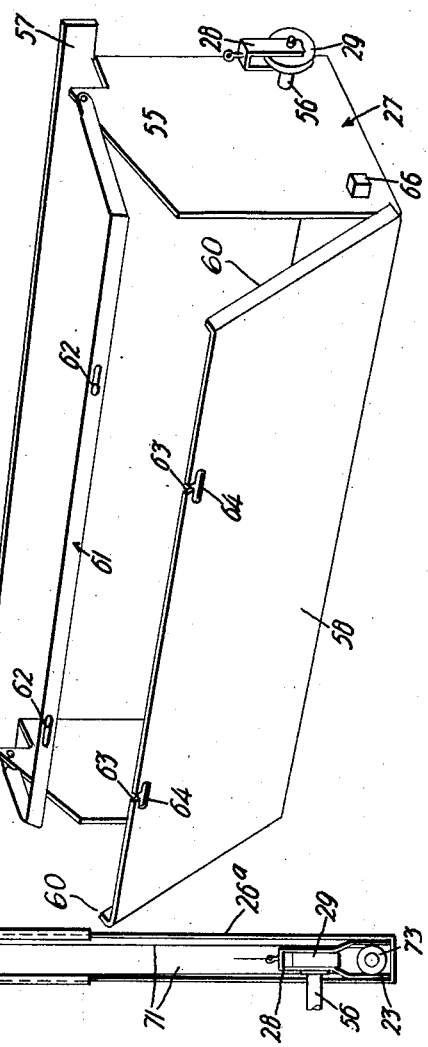
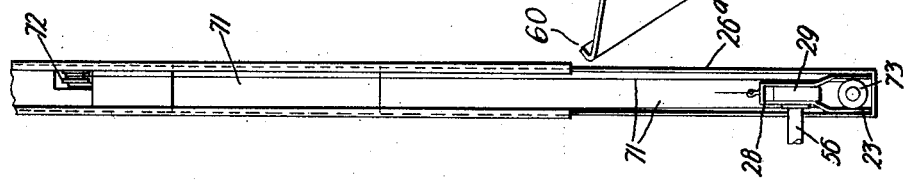
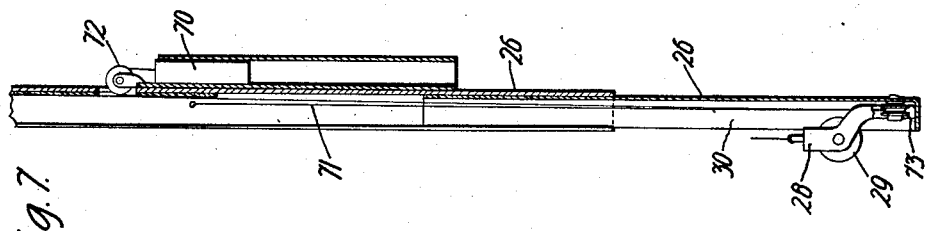
Inventor
Otto C Knigge
By his Attorneys Sept. 16, 1930.  O. C. KNIGGE  1,775,726
REFUSE COLLECTION VEHICLE
Filed June 15, 1927   6 Sheets-Sheet 4
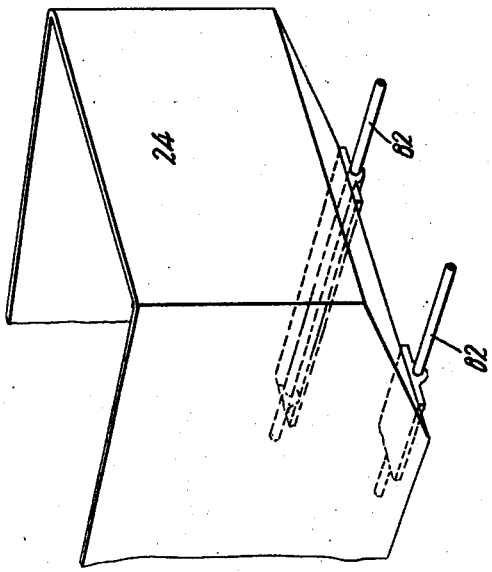
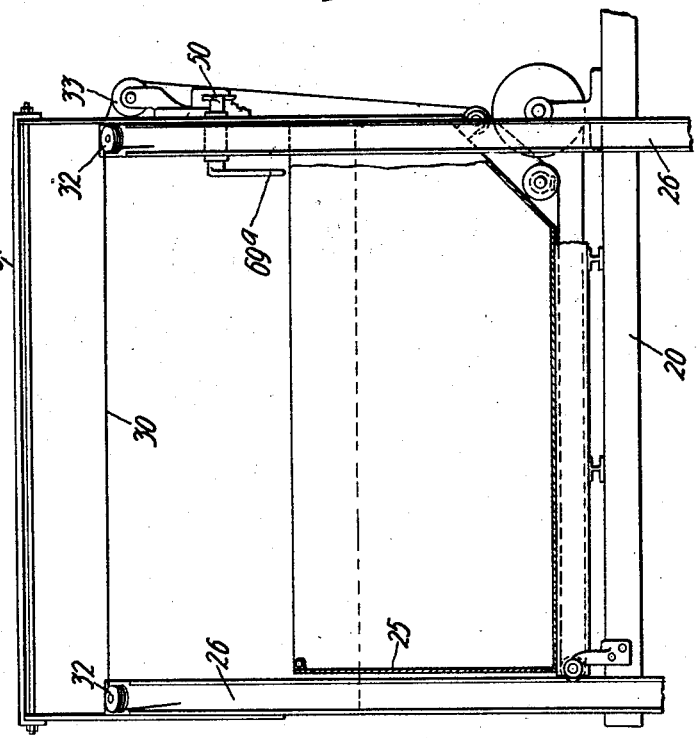
Inventor
Otto C Knigge
By his Attorneys
Dean Fairbank Albright & Hirsch Sept. 16, 1930.  O. C. KNIGGE  1,775,726
REFUSE COLLECTION VEHICLE
Filed June 15, 1927  6 Sheets-Sheet 5
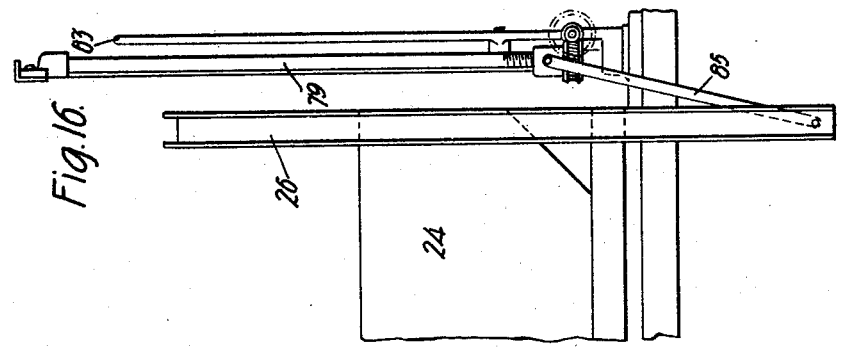
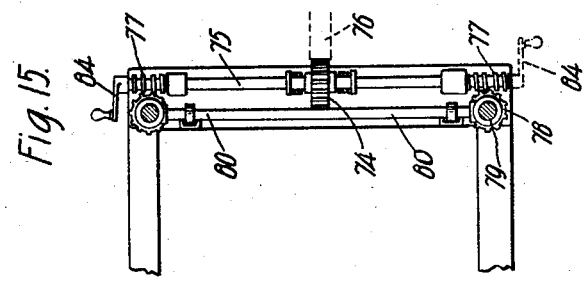
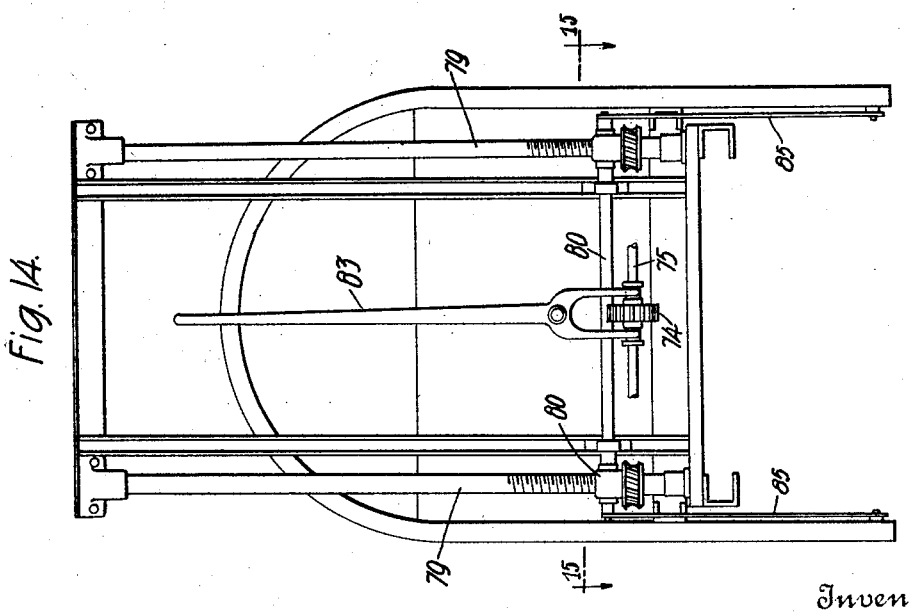

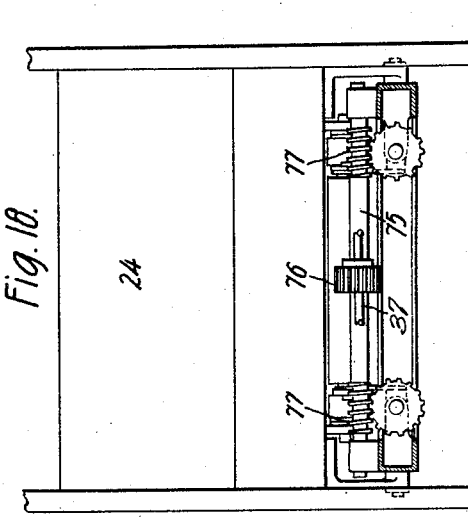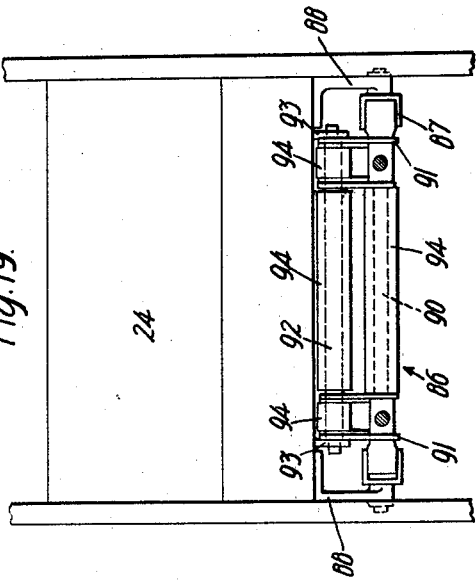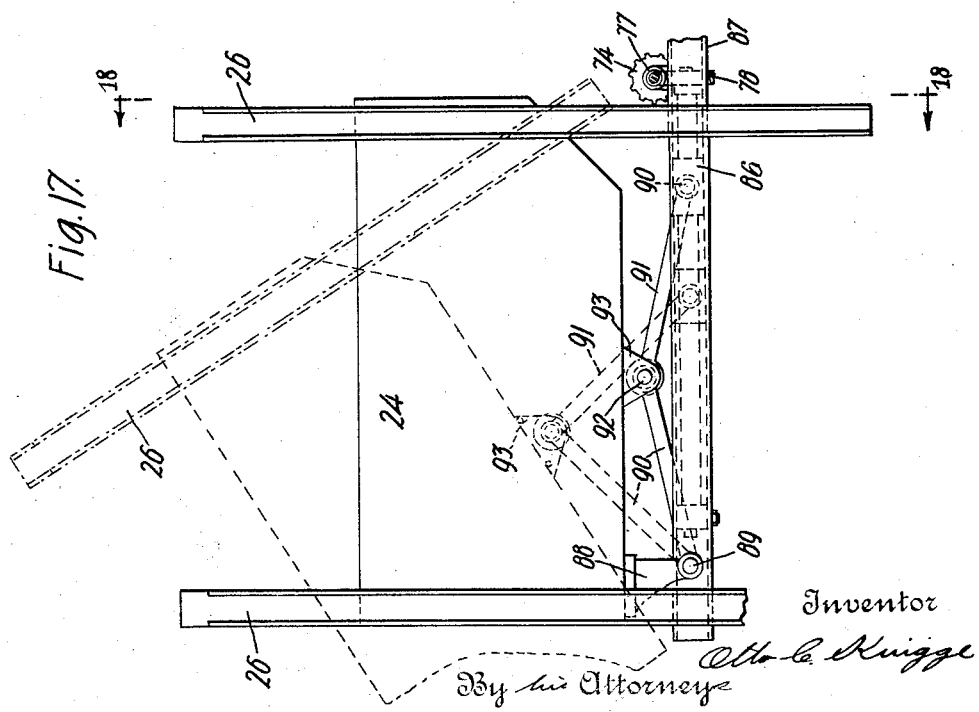

Patented Sept. 16, 1930

1,775,726

UNITED STATES PATENT OFFICE

OTTO CHARLES KNIGGE, OF MOUNT VERNON, NEW YORK

REFUSE-COLLECTION VEHICLE

Application filed June 15, 1927. Serial No. 198,914.

This invention relates to vehicles provided with means for loading and unloading materials such as refuse, ashes and garbage, and more particularly to motor trucks in which the loading and unloading is effected by use of the motors of such vehicles. The present invention is an improvement on the invention described and claimed in my Patent No. 1,324,675 of December 9, 1919.

The main object of my present invention is to provide a motor truck or vehicle in which the loading and unloading can be effected with the least effort to those attending the same and one by which material may be handled in as sanitary a manner as possible.

An important feature of the invention is that it enables an arrangement for collecting refuse or other material at both sides of the body, thus rendering it convenient to collect from both sides of the street.

In carrying out the invention a vehicle or truck may be provided at one or both sides with tracks curving upwardly and inwardly around the upper edges of both sides of the body of said truck or vehicle. These tracks are rigidly connected to said body and have cooperating therewith loaders and means for hoisting said loaders to the top of the tracks and dumping the material therein into the vehicle body. To enable the loaders to be lowered as far as possible for convenience in placing material therein, the tracks may be provided with slidable extensions which move downwardly with the loaders substantially to the ground or pavement, thereby enabling the loaders to be filled without unnecessary effort in lifting the material. When the loaders are raised, the extensions are moved upwardly to their normal positions, preferably by a counterbalance arrangement, thus avoiding striking of the ground or different objects by the lower ends of the tracks when the truck is moved or dumped.

The loaders may be formed with front walls in the form of doors, hinged or pivoted at their lower edges, so that they may be turned downwardly to the level of the bottom wall of the loaders or below, thus enabling loose material or containers filled with said material to be moved into the loaders without lifting. The loaders are also provided with means for locking the front walls in closed position to hold the loose material or containers with the waste or refuse material therein during the hoisting movement of said loaders. When the loader is filled with containers, it may be desirable to retain the containers in the loader, while dumping. To this end the loader may be constructed with means to prevent the containers from being dumped in the body. Preferably the loaders extend the full length of the cargo or vehicle body.

In handling material such as ashes, garbage and the like, it is desirable for sanitary and other purposes to have a covered body and this result may be obtained according to the present invention by attaching to said tracks a cover or top having at each side of the body doors pivoted or hinged near their upper edges and extending the full length of the body. The doors and the main bodies of the loaders may be provided with coacting means so that the door is opened automatically by the loader in its upward movement to dumping position and then closed, remaining in this position during the dumping period. The loaders may be retained in dumping position inside the hinged doors during the movement of the truck from one place to another. In the return movement of the loaders the doors are opened and after the exit of the loaders return to closed position.

The hoisting means for the loaders should be such as not to interfere with the opening of the rear door of the vehicle body for dumping and also such as to avoid any change in condition of the loader hoisting apparatus during the dumping of the truck body. This result may be obtained according to the present invention by the use of flexible connectors such as chains extending from the connection with the loader upwardly along each track over suitable anti-friction rollers and then around suitable pulleys at the upper ends of the curved tracks to the front of the dumping body where they pass over pulleys arranged so that the direction of pull may be exerted downwardly. These connectors or chains may be connected to flexible connectors extending down the front of the vehicle body to a pulley connected therewith and then rearwardly under the vehicle body to a pulley or pulleys mounted to turn about the pivotal dumping axis of the truck body. The flexible connection then extends forwardly to a winding means which may be operated by the motor of the vehicle. Such winding means may be similar to a winch and may consist of a drum for each loader mounted loosely on a shaft revolved from the motor and arranged for connection, frictionally for example, either with said shaft or with stationary brake members. Preferably the vehicle body is tapered or otherwise shaped at its lower front edge to accommodate said winding means. This shaping also tends to facilitate complete dumping.

The dumping means for the truck body is preferably of double screw type with screws arranged either under the body or in upright position so as to hold the truck body rigidly against movement in either direction when disconnected from the motor. The screws are arranged vertically or horizontally at opposite sides of the body and are provided at their lower ends with worm gears meshing with worms at opposite ends of a transverse shaft which can, at the will of the operator, be connected to or disconnected from the motor or the winch-like winding means driven by the motor. The rotation of the screws effects upward and downward or horizontal movement of a cross head connected to the truck body in any suitable manner.

The connection between the vehicle body and the cross head on the upright screw shafts may be effected by a device having a slidable connection forwardly and rearwardly at the bottom of the truck body and pivoted to the cross head along a horizontal axis. This connection may, however, be made in other ways, as for example by links pivoted at their upper ends to the cross head and at their lower ends to the front tracks at opposite sides of the truck body.

Another feature of the invention resides in the provision of latching means for holding the side doors of the cover in closed position and provisions whereby the operation of the winding mechanism is started by releasing the latches for such doors, such latches being held in closed position by the loaders when said loaders are in dumping position inside the cover.

Other features and advantages will appear hereinafter.

In the accompanying drawings,

Fig. 1 is a fragmentary diagrammatic view, partly in section, illustrating a motor truck equipped with one embodiment of my invention, the bottom of the loader being substantially at the ground or pavement level;

Fig. 2 is a fragmentary front elevation, partly in section, showing in full lines loaders in loading position and in broken lines one of said loaders in dumping position;

Fig. 3 is a view similar to Fig. 2 but showing the means for hoisting the loaders and the connection of the latches for the side doors of the cover with the controlling devices for the hoisting means;

Fig. 4 is a detail sectional view of the mechanism for controlling the loaders;

Fig. 5 is a sectional view along the line 5—5 of Fig. 4;

Fig. 6 is a detail view illustrating the operation of the screw sleeves for connecting the winding drums with the driving shaft or with the stationary brake members;

Fig. 7 is a sectional view illustrating the connection between the fixed tracks and the track extensions and the counterbalancing means by which the track extensions are raised when the loaders are hoisted;

Fig. 8 is a view of the structure of Fig. 7 as seen from the left, the counterweight being at the rear of the stationary track;

Fig. 9 is a perspective view of a loader showing the front wall released;

Fig. 10 is a cross section of the loader with the front wall closed and showing in broken lines a container which is held in the loader during dumping into the receptacle body;

Fig. 11 is an end elevation of a loader;

Fig. 12 is a fragmentary side elevation, part of the body being broken away;

Fig. 13 is a fragmentary view showing, in connection with a modified form of vehicle body, the connection underneath the vehicle body between the body dumping means and the body;

Fig. 14 is a fragmentary front elevation illustrating dumping means having a modified connection with vehicle body;

Fig. 15 is a view taken along the line 15—15 of Fig. 14;

Fig. 16 is a side elevation of the structure shown in Fig. 14;

Fig. 17 is a side elevation illustrating a modified form of dumping with an underbody hoist;

Fig. 18 is a front elevation of the structure shown in Fig. 17; and

Fig. 19 is a view taken along the line 19—19 of Fig. 17.

Referring to the drawings, the vehicle or truck includes a chassis or frame 20 provided at the rear with brackets 21 carrying a shaft 22 on which are pivotally mounted beams or members 23 carrying the truck body 24 which is provided at its rear with a door 25 hinged at its upper edge so as to allow dumping of material out of the body 24 when it is tilted about the shaft 22. The truck is also provided at opposite ends and preferably at both sides with curved tracks 26 extending upwardly along the sides of the truck body and curved over the same at the top. Preferably these tracks are formed of channel iron. Mounted on these tracks are loaders 27 provided at opposite ends with projecting pivots carrying frames 28 which fit into said tracks and guide therein rollers 29 mounted on these pivots and in the frames 28.

The frames 28 are connected at their upper ends with flexible connectors 30 which may be in the form of chains which run over suitable rollers 31 to reduce frictional engagement of the flexible connectors with the tracks and then pass around pulleys 32 from which they pass to the front of the vehicle body to pulleys 33 turning about horizontal axes. The flexible connectors 30 are connected by flexible connections 34 with the hoisting means proper and said flexible connections 34 extend around pulleys 35 connected with the beams 23 and around pulleys 35$^a$ on said shaft 22 from which they extend forwardly under the body to drums 36 loosely mounted on a shaft 37. It is not necessary to have both flexible connectors 30 on each side extend to the corresponding drum 36 and it would be undesirable inasmuch as the connectors would tend to twist around each other. The flexible connection 34 for either side may consist of one of the flexible connectors 30 to which the other is connected or a separate connector to which both of the connectors 30 are connected.

Preferably the two chains 30 connected with the loader at either side of the body are joined at such a point that the coupling will not pass around any of said pulleys. For example, the coupling may be arranged so that it will travel back and forth between the pulleys 35 and 35$^a$.

The shaft 37 is provided with a wormwheel 38 meshing with a worm 39 on a shaft 40 which is actuated preferably from the power take-off of the motor of the vehicle and through a transmission. Fixed on the shaft 37 are clutch members 41 with outer conical surfaces and the drums 36 are provided with members having internal conical surfaces shaped to engage the clutch members 41 and effect driving engagement between the shaft 37 and the drums 36. The drums 36 are normally urged out of such driving connection by means of springs 42. These springs may be between the clutches and drums to press the drums against a corresponding brake when the drums are permitted to move in that direction.

At their outer ends the drums 36 are connected with sleeves 43 fitting over the shaft 37 and connected with the drums 36 so that there is relative freedom as to turning but the drums may be moved along the shaft by the sleeves. Each sleeve 43 is threaded in a stationary sleeve 44 so that by turning the sleeve 43 in one direction the corresponding drum 36 may be engaged with the cone clutch member 41 and by turning the sleeve in the other direction, the drum will be pressed by the corresponding spring 42 against a fixed brake member 45. This arrangement enables the drum to be connected with the shaft 37, released therefrom to allow the loader to move downwardly, or subjected to braking action as required.

To effect such turning of the sleeves 43, each of the sleeves is provided with a pinion 46 meshing with a gear or gear segment 47 which is controlled by means of an arm 48 connected by a link 49 with a lever 50 pivoted at 51 and carrying at its outer end a flexible connection 52 which hangs at the side of the vehicle for control by the operator in throwing the hoisting means into and out of operation. The return of the parts to their normal position may be done by reversing the driving mechanism from the power take-off device as by means of a transmission such as already used in similar devices in hoisting machinery. The hoisting mechanism just described is of the winch type.

Each loader 27 comprises rear and bottom walls 53 and 54 respectively, connected with end walls 55 from which project the members or pivots 56 on which the frames 28 and rollers 29 are mounted. As already stated the rollers 29 run in the tracks 26 and the loaders 27 are kept from tilting outward by projections 57 at the upper edge of the rear wall 53, such projections 57 engaging the tracks at the rear. The front wall 58 of the loader is pivoted at its lower edge so that it may be swung downwardly and outwardly to or below the level of the bottom of the loader to permit the insertion of material or receptacles from the side. This arrangement is of particular value when containers 59 such as ash cans are to be placed in said loaders and dumped therefrom into the body of the vehicle. When the loader 27 has been loaded as required, the front wall 58 is swung upwardly to closed position so that its flanges 60 engage the outer surfaces of the ends 55. To lock the front wall or door in closed position, use is made of a bail 61 pivoted near the rear wall and at the sides or ends of the loader and at the top of the loader and shaped so as to engage the upper edges of the door 58 and of the sides when in closed position.

As illustrated in Fig. 10, the bail 61 is provided with a downwardly facing channel which fits over the upper edge of the door 58 and the sides of the loader and serves to hold the door in closed position. To prevent accidental or unintentional release of the bail, it is provided with bolts 62 slidable longitudinally of the main part thereof so that these bolts may pass down through notches 63 at the upper edge of the door 58 and then be shifted to one side or the other in slots 64 parallel to the upper edge of the door 58 thereby locking the bail to the door 58. To hold the containers 58 in the loader when the loader is dumped, provision is made of a ledge or shelf 65, here shown as attached to the bail 61 and so positioned as to engage the upper edges of containers 59 and hold the containers in the loader when it is dumped. The ledge or shelf 65 may, however, be attached to the door of the loader.

Each loader is also provided at the lower forward corners of its ends with projections 66 and when the loader is hoisted, the projections 57 in engagement with the rear sides of the tracks cause the loader to tilt rearwardly until it becomes overbalanced and swings to dumping position as indicated in broken lines in Figs. 2 and 3, the movement of the loader in this dumping operation being limited by engagement of the projections or members 66 with the upper edges of the tracks.

It should be understood that the loaders are adapted for use with or without receptacles. If there are only a few receptacles to be emptied, as for private houses, the receptacles may be dumped directly into the loader. If there is a large number of receptacles at one place, for example ash cans from an apartment house or large building, the receptacles with the material therein are placed on the loader or loaders and after being fastened therein are hoisted and dumped, the loader and receptacles therein then being returned to loading position substantially automatically.

According to the present invention, the vehicle is also provided with a cover 67 having side doors 68 hinged at their upper edges and flared outwardly at their lower edges to cooperate with the inclined upper edges of the ends 55 of the loaders 27 so that in the upward movement of each loader the corresponding door 68 is swung automatically outwardly as indicated at the left of Fig. 3 to permit the loader to move to dumping position. The door 68 closes automatically as the loader passes into the covered vehicle body. Preferably the loaders are kept in this dumping position inside the covered body during the movement of the vehicle from one place to another, as desired for sanitary purposes.

Upon releasing the drums 36, without bringing the brakes into operation to prevent such movement, the loaders will slide by their own weight down the tracks, swing the doors 68 open and turn back into their original positions, such swinging of the loaders being effected by striking against fixed parts such as the sides of the body 24. If the weight of the loaders is not sufficient to turn the drums for unwinding the same, the drums may be turned by the motor in the unwinding direction. As indicated in Fig. 3, the levers 50 are provided with projections or hooks 69 which may serve to lock the doors 68 in closed position. Upon pulling either one of the flexible members 52, the corresponding door 68 will be released from the hook 69 and the lever acting through the corresponding link 49 will throw the corresponding drum into operation to hoist the loader and dump the contents into the vehicle body, when the shaft 40 is rotating in one direction, or to lower the loader from dumping position to loading position when the shaft 40 is rotating in the opposite direction. Release of the drums at the time of the dumping action may be effected by the swinging of the loaders against arms 69$^a$ fixedly connected with the levers 50 at the pivot points 51.

In order to drop the loaders close to the ground for loading, it is necessary to have tracks which extend substantially to the ground and if fixed tracks of such length were used, the tracks would tend to interfere with dumping of the body and with movement of the vehicle from one place to another. I have met such requirements by providing track extensions 26$^a$ which fit in the lower ends of the fixed tracks 26 and are normally urged upwardly by counterweights 70 guided between the tracks 26 and the vehicle body and attached in each instance to a cable 71 which extends around a fixed pulley 72 into the track and around a pulley 73 in the lower part of the track extension and upwardly into the fixed track to an aperture through which it passes to an outside point where it is secured in any suitable manner. When the loaders move downwardly, the frames 28 engage the lower ends of extensions 26$^a$ and move them downwardly as required and when the loaders are lifted, the extensions rise therewith until the upper edges of their rear walls engage corresponding portions of the rear walls of tracks 26.

The dumping and return movements of the body 24 about the shaft 22 may be effected by bringing a gear 74 on a cross shaft 75 into mesh with a gear 76 adjacent worm gear 38 (Fig. 4). The shaft 75 has at opposite ends worms 77 meshing with worm gears 78 on the lower ends of screws 79 threaded through a vertically guided cross head 80 to which is pivoted a frame having rod portions 82 (Figs. 2 and 13) slidable in guides secured to the vehicle body. This connection provides for the movement of the body to and from the vertical screws as it is swung back and forth. The shifting of the gear 74 along the shaft 75 may be done by means of a lever 83 at the back of the driver's cab (Fig. 14). Under some conditions, it may be desirable to tilt the body 24 by hand. This may be done by cranks 84 on the ends of the shaft 75 in either horizontal or vertical screw type. It will be evident that for such body dumping the connection between the shaft 40 and the motor must be such as to enable the shaft to be reversed by the use of a suitable transmission. Such a connection is indicated in my said Patent No. 1,324,675.

Although the connection between the cross head 80 and the vehicle body has been disclosed as including a frame having members or rods 82 slidable in brackets or tubes at the bottom of the body, this connection may be made by links 85 pivoted to the cross head and to the forward tracks.

According to another embodiment of the invention (Figs. 17, 18 and 19), the screws driven by the worms 77 are arranged horizontally for under-body hoisting and act on a cross head 86 guided and supported by channel members 87 forming part of the chassis and on which the vehicle body 24 is pivoted in any convenient way, as by means of brackets 88 secured to the body. By guiding the cross head as described, the weight of the body is kept from the screws. It should be understood that the support of the cross head may be effected in other ways as, for example by channel members beneath said screws and receiving in upwardly facing channels parts projecting downwardly from the cross head. As a matter of fact, the construction as to screws, cross heads and guides for cross heads may be substantially the same whether the screws are arranged vertically or horizontally.

Mounted on the shaft 89 and on the cross head 86 are links 90 and 91, respectively, corresponding front and rear links being pivotally connected by a shaft 92 mounted in brackets 93, the links being held in their proper positions by suitable spacers 94. By operating the shaft 75 in one direction or the other, the body 24 may be tilted to dumping position or restored to normal position.

It should be understood that various changes may be made without departing from the true spirit and scope of the invention.

Having thus described my invention, I claim:

1. The combination with a vehicle body, of curved tracks associated with said body at the front and rear on both sides and curved over the top thereof, a cover at top having side doors hinged at their upper edges to swing outwardly and extending substantially the full length of said body, loaders traveling on said tracks and extending the full length of said body on each side thereof, means for hoisting and dumping said loaders into said body and controlling the movement thereof to loading positions, and means for automatically opening and closing said doors as the loaders move back and forth.

2. The combination with a vehicle body, of tracks fixed to said body at the front and rear on both sides thereof and curved over the top at the sides thereof, a cover having side doors hinged at their upper edges to swing outwardly and extending substantially the full length of said body, loaders traveling on said tracks and extending the full length of said body on each side thereof, means for hoisting and dumping said loaders and moving the same to loading positions, means for automatically opening and closing said doors as the loaders move back and forth, one of said tracks having a movable extension at the lower end, at each side of the body, and means to urge said extension upwardly when the loader is lifted, but to permit lowering of said extension by downward movement of the loader.

3. The combination with a vehicle body having at one side thereof tracks curved inwardly over the upper edge of the adjacent side of said body, one of said tracks having a portion fixed with respect to the vehicle body and a movable extension at the lower end of the fixed portion of the track, a loader to travel on said tracks, and means to urge said extension upward when said loader is lifted but permitting lowering of said extension by downward movement of the loader.

4. The combination with a vehicle body having at both sides thereof tracks curved inwardly over the corresponding side walls, of a cover for said body extending over the tracks and adjacent thereto, a door hinged at each side of the body at its upper edge, a loader mounted on said tracks for dumping into the top of said body, and means whereby said loader as it is hoisted, swings said door outwardly and permits the closing of said door as the loader moves to dumping position in the body.

5. In a motor vehicle, a body, two curved tracks fixed to said body at both sides near the ends of the body and curved inwardly over the top thereof, a cover over said tracks including a side door hinged at its upper edge, a latch for holding said side door in closed position, a loader with rollers at each end and extending from end to end of said body, with said rollers in said tracks, and means to lift said loader including a motor-operated drum adjacent the front end of said body, a flexible connector for each of said tracks and connected to the roller at the corresponding end of said loader, a pulley at the top of each track around which the corresponding flexible connector passes to the front end of said body, pulleys at the upper and lower edges of the front end of the body, and a flexible connection around said pulleys from said connectors to said drum, means for controlling the operation of said drum, and a connection from said latch to operate said controlling means, whereby releasing of the latch releases the drum and further movement of the latch causes operation of the drum.

Signed at New York, in the county of New York and State of New York, this 14th day of June, A. D. 1927.

OTTO CHARLES KNIGGE.